(12) United States Patent
Zhang et al.

(10) Patent No.: US 11,201,549 B2
(45) Date of Patent: Dec. 14, 2021

(54) CONTROL METHOD OF POWER CONVERSION CIRCUIT, AND RELATED POWER CONVERSION CIRCUIT

(71) Applicant: Huawei Technologies Co., Ltd., Shenzhen (CN)

(72) Inventors: Yanzhong Zhang, Shanghai (CN); Chunyang Liu, Xi'an (CN); Zheng Ma, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/945,091

(22) Filed: Jul. 31, 2020

(65) Prior Publication Data

US 2020/0366211 A1 Nov. 19, 2020

Related U.S. Application Data

(63) Continuation of application No. PCT/CN2018/125802, filed on Dec. 29, 2018.

(30) Foreign Application Priority Data

Jan. 31, 2018 (CN) .......................... 201810098063.3

(51) Int. Cl.
*H02M 3/335* (2006.01)
*H02M 7/483* (2007.01)
(Continued)

(52) U.S. Cl.
CPC ..... *H02M 3/33569* (2013.01); *H02M 1/0095* (2021.05); *H02M 3/01* (2021.05);
(Continued)

(58) Field of Classification Search
CPC ............ H02M 3/335; H02M 3/33569; H02M 1/0095; H02M 3/01; H02M 3/33507; H02M 7/483; H02M 1/0058
See application file for complete search history.

(56) References Cited

U.S. PATENT DOCUMENTS 6,349,044 B1 * 2/2002 Canales-Abarca ..... H02M 1/34
363/17
2011/0278953 A1 11/2011 Zhang et al.
(Continued)

FOREIGN PATENT DOCUMENTS

CN 2415540 Y 1/2001
CN 101018017 A 8/2007
(Continued)

OTHER PUBLICATIONS

Soeiro et al., "Novel 3-level Hybrid Neutral-Point-Clamped Converter," IECON 2011—37th Annual Conference of the IEEE Industrial Electronics Society, Total 6 pages, XP032105165, Institute of Electrical and Electronics Engineers, New York, New York (Nov. 2011).

*Primary Examiner* — Gary L Laxton
(74) *Attorney, Agent, or Firm* — Leydig, Voit & Mayer, Ltd.

(57) ABSTRACT

A related power conversion circuit includes a three-level switch circuit and a resonant circuit, and a control method of the related power conversion circuit includes: controlling all transistors in the three-level switch circuit to be turned off, where a body diode connected in parallel to a transistor S1, a body diode connected in parallel to a transistor Q1, and a body diode connected in parallel to a transistor Q2 are all turned on based on a current freewheeling function of the resonant circuit; controlling the S1 to be turned on, to set up a first working state of the power conversion circuit; and
(Continued)

after the first working state lasts for a time length T1, controlling the Q1 and the Q2 to be turned on.

10 Claims, 15 Drawing Sheets

(51) Int. Cl.
    *H02M 1/00*     (2006.01)
    *H02M 7/48*     (2007.01)
    *H02M 3/00*     (2006.01)

(52) U.S. Cl.
    CPC .......... *H02M 7/483* (2013.01); *H02M 7/4815* (2021.05); *H02M 1/0058* (2021.05)

(56) References Cited

U.S. PATENT DOCUMENTS

| | | | |
|---|---|---|---|
| 2013/0154716 A1 | 6/2013 | Degener et al. | |
| 2014/0198536 A1* | 7/2014 | Fu | H02M 3/33576 363/17 |
| 2018/0294732 A1* | 10/2018 | Ye | H02M 3/33546 |

FOREIGN PATENT DOCUMENTS

| | | |
|---|---|---|
| CN | 101640497 A | 2/2010 |
| CN | 102624266 A | 8/2012 |
| CN | 103236796 A | 8/2013 |
| CN | 102420538 B | 11/2013 |
| CN | 102148583 B | 2/2015 |
| CN | 105048851 A | 11/2015 |
| CN | 204835974 U | 12/2015 |
| CN | 205847105 U | 12/2016 |
| CN | 106533232 A | 3/2017 |
| CN | 107317508 A | 11/2017 |
| CN | 108123605 A | 6/2018 |
| EP | 2728734 A1 | 5/2014 |
| JP | 2017077096 A | 4/2017 |

\* cited by examiner

CONTROL METHOD OF POWER CONVERSION CIRCUIT, AND RELATED POWER CONVERSION CIRCUIT

CROSS REFERENCE TO RELATED APPLICATION

This application is a continuation of International Application No. PCT/CN2018/125802 filed on Dec. 29, 2018, which claims priority to Chinese Patent Application No. 201810098063.3 filed on Jan. 31, 2018. The disclosures of the aforementioned applications are hereby incorporated by reference in their entireties.

TECHNICAL FIELD

This application relates to the field of power supply technologies, and in particular, to a control method of a power conversion circuit, and a related power conversion circuit.

BACKGROUND

Power conversion circuits are widely used for conversion from electric energy at one voltage level to electric energy at another voltage level. For example, in DC-DC conversion, a DC-DC conversion circuit performs working procedures such as voltage transformation, rectification, and filtering on a source input voltage, and finally outputs a needed voltage to a load. A power conversion circuit usually includes a switch circuit, a transformer, a rectifier circuit, and a filter circuit. To implement orderly and stable power conversion, highly frequent control operations usually need to be performed on the switch circuit in the power conversion circuit. Therefore, energy losses in the power conversion circuit mainly result from a switching loss, a conduction loss, and a current switching loss that are in the switch circuit. However, in the prior art, a switching loss, a conduction loss, and a current switching loss that are in a switch circuit usually cannot be reduced at the same time, and technical integration is still faced with a serious challenge.

SUMMARY

Embodiments of the present application provide a control method of a power conversion circuit, and a related power conversion circuit, so as to reduce a switching loss, a conduction loss, and a current switching loss that are in the power conversion circuit.

According to a first aspect, an embodiment of the present application provides a control method of a power conversion circuit, where the power conversion circuit includes a three-level switch circuit, a resonant circuit, a transformer, a rectifier circuit, and a filter circuit, three input ends of the three-level switch circuit are respectively connected to a DC voltage output end P, a reference voltage output end UREF, and a DC voltage output end N, an output end SM of the three-level switch circuit is connected to an input end of the resonant circuit, an output end of the resonant circuit is connected to a primary-side winding of the transformer, a secondary-side winding of the transformer is connected to an input end of the rectifier circuit, and an output end of the rectifier circuit is connected to an input end of the filter circuit; and the three-level switch circuit includes a switch unit UC1 and a switch unit UC4, one end of the UC1 is connected to the P, another end of the UC1 is connected to the UREF, an output end of the UC1 is X1, the UC1 includes a first switching transistor Q1 connected between the P and the X1, one end of the UC4 is connected to the N, another end of the UC4 is connected to the UREF, an output end of the UC4 is X4, and the UC4 includes a first switching transistor Q4 connected between the DC voltage output end N and the X4; and the three-level switch circuit further includes a second switching transistor Q2 connected between the X1 and the SM, a second switching transistor Q3 connected between the X4 and the SM, a third switching transistor S1 connected between the P and the SM, and a third switching transistor S2 connected between the N and the SM, where the Q1, Q2, Q3, Q4, S1, and S2 each include a transistor, each of the transistors is connected in parallel to a body diode, and a direction of the body diode is set as follows: the body diode is turned on when the transistor connected in parallel to the body diode is reverse biased.

While operating, all the switching transistors Q1, Q2, Q3, Q4, S1, and S2 are controlled in an orderly manner by a control unit; turn-on and turn-off of different switching transistors are controlled, so as to output AC voltages VSs and alternating currents ISs with different magnitudes and directions.

A control process of the power conversion circuit in this embodiment of the present application includes a case in which the three-level switch circuit works in a positive half cycle of a pulse width modulation signal, and a case in which the three-level switch circuit works in a negative half cycle of a pulse width modulation signal. The following describes the control method provided in this embodiment of the present application, mainly from a perspective of the case in which the three-level switch circuit works in the positive half cycle of the pulse width modulation signal.

When the three-level switch circuit works in the positive half cycle of the pulse width modulation signal, the method includes the following steps: controlling all the transistors to be turned off, where a body diode of the S1, a body diode of the Q1, and a body diode of the Q2 are all turned on based on a current freewheeling function of the resonant circuit; controlling the S1 to be turned on, to set up a first working state of the power conversion circuit; and after the first working state lasts for a time length T1, controlling the Q1 and the Q2 to be turned on.

In this embodiment of the present application, the S1 and the S2 have a property of a low conduction loss, and the Q1, the Q2, the Q3, and the Q4 have a property of a low turn-off loss.

It can be learned that, the power conversion circuit provided in this embodiment of the present application includes the three-level switch circuit and the resonant circuit. In a process of controlling the three-level switch circuit, when all the transistors are turned off, the body diodes of the related transistors (for example, the S1, the Q1, and the Q2) are turned on based on the current freewheeling function of the resonant circuit, and voltages of the body diodes of the related transistor are a voltage drop across a diode (close to 0). Then, when the S1 is being turned on, the S1 has a zero-voltage switch (ZVS) characteristic in a turn-on process, and then, when the Q1 and the Q2 are being turned on, the Q1 and the Q2 also have a ZVS characteristic. This reduces switching losses of the related switching transistors in turn-on processes. In addition, because the S1 is controlled to be turned on before the Q1 and the Q2 are turned on, when the Q1 and the Q2 are turned on, a small part of a current switches from a branch circuit in which the S1 is located, to a branch circuit in which the Q1 and the Q2 are located, and impedance of the branch circuit in which the Q1 and the Q2 are located is greater than that of the branch circuit in which S1 is located. Therefore, only an extremely small part of the current needs to be switched. This can avoid extra electromagnetic interference (EMI) resulting from a rapid change of the current in a short time, and reduce a current switching loss. In addition, after the S1 the Q1, and the Q2 are all turned on, a majority of the current flows through the S1, and the S1has the property of a low conduction loss. Therefore, a conduction loss in the circuit can be greatly reduced. In other words, implementing this embodiment of the present application can reduce the switching loss, the conduction loss, and the current switching loss in the power conversion circuit at the same time.

With reference to the first aspect, in a first possible implementation, after the controlling the Q1 and the Q2 to be turned on, the method further includes a process of turning off the switching transistors.

A first possible turn-off process is: controlling the S1to be turned off before the Q1 is turned off, and controlling the Q1 to be turned off before the Q2 is turned off, to switch from the first working state to a second working state.

A second possible turn-off process is: controlling the S1 to be turned off before the Q2 is turned off, and controlling the Q2 to be turned off before the Q1 is turned off, to switch from the first working state to a second working state.

In this embodiment of the present application, a conduction loss of the S1 is less than a sum of conduction losses of the Q1 and the Q2, a conduction loss of the S2 is less than a sum of conduction losses of the Q3 and the Q4, a sum of turn-off losses of the Q1 and the Q2 is less than a turn-off loss of the S1, and a sum of turn-off losses of the Q3 and the Q4 is less than a turn-off loss of the S2. Therefore, in the process of turning off the switching transistors, the S1 is controlled to be turned off before the Q1 and the Q2 are turned off, and at last, the Q1 and the Q2 are turned off. Because the Q1 and the Q2 have a low turn-off loss, a switching loss in the turn-off process is reduced.

With reference to the first aspect, in a second possible implementation, a circuit structure of the three-level switch circuit has a plurality of implementation forms. In a possible circuit structure, the UC1 further includes a diode DH connected between the UREF and the X1, where the DH is configured to set up the second working state when the S1 and the Q1 are both turned off; and the UC4 further includes a diode DB connected between the UREF and the X4. A turn-off process for this circuit structure may be designed by referring to the first possible turn-off process.

With reference to the second possible implementation of the first aspect, in a possible implementation, the three-level switch circuit has a plurality of variant structures. In a variant structure, a transistor K1 and a transistor K2 are added to the three-level switch circuit described in the first aspect. The K1 is connected in parallel to a body diode KD1, and a direction of the KD1 is set as follows: the KD1 is turned on when the K1 is reverse biased. The K2 is connected in parallel to a body diode KD2, and a direction of the KD2 is set as follows: the KD2 is turned on when the K2 is reverse biased. A collector of the K1 is connected to a connection point between the DH and the DB, an emitter of the K1 is connected to an emitter of the K2, and a collector of the K2 is connected to a connection point between the Q2 and the Q3, so as to be connected to the SM. The K1 and the K2 are configured to set up the second working state when the S1 and the Q1 are both turned off. A turn-off process for this circuit structure may be designed by referring to the first possible turn-off process.

With reference to the second possible implementation of the first aspect, in another variant structure, in the three-level switch circuit, a transistor Q5 and a transistor Q6 are used in place of the DH and the DB. The Q5 is connected in parallel to a body diode D5, and a direction of the D5 is set as follows: the D5 is turned on when the Q5 is reverse biased. The Q6 is connected in parallel to a body diode D6, and a direction of the D6 is set as follows: the D6 is turned on when the Q6 is reverse biased. A collector of the Q5 is connected to the output end X1 of the UC1, and an emitter of the Q5 is connected to the UREF. An emitter of the Q6 is connected to the output end X4 of the UC4, and a collector of the Q6 is connected to the UREF. The Q6 is configured to set up the second working state when the S1 and the Q2 are both turned off. A turn-off process for this circuit structure may be designed by referring to the second possible turn-off process.

With reference to the second possible implementation of the first aspect, in another variant structure, in the three-level switch circuit, the UC1 and the UC4 include a capacitor C connected between the X1 and the X4, where the capacitor C is used in place of the DH and the DB. One end of the capacitor C is connected to the output end X1 of the UC1, and another end of the capacitor C is connected to the output end X4 of the UC4. The capacitor C is configured to set up the second working state when the S1 and the Q2 are both turned off. A turn-off process for this circuit structure may be designed by referring to the second possible turn-off process.

With reference to the first aspect, in a third possible implementation, referring to the implementation processes of the foregoing circuit structures and the control method, when the three-level switch circuit works in the negative half cycle of the pulse width modulation signal, the method further includes the following steps: controlling all the transistors to be turned off, where the body diodes are turned on based on the current freewheeling function of the resonant circuit; controlling the S2 to be turned on, to set up a third working state of the power conversion circuit; and after the third working state lasts for a time length T2, controlling the Q3 and the Q4 to be turned on.

With reference to the third possible implementation of the first aspect, after the controlling the Q3 and the Q4 to be turned on, the method further includes a process of turning off the switching transistors, where the process includes: controlling the S2 to be turned off before the Q4 is turned off, and controlling the Q4 to be turned off before the Q3 is turned off, to switch from the third working state to a fourth working state.

According to a second aspect, an embodiment of the present application provides a power conversion circuit, where the power conversion circuit includes a three-level switch circuit, a resonant circuit, a transformer, a rectifier circuit, and a filter circuit, three input ends of the three-level switch circuit are respectively connected to a DC voltage output end P, a reference voltage output end UREF, and a DC voltage output end N, an output end SM of the three-level switch circuit is connected to an input end of the resonant circuit, an output end of the resonant circuit is connected to a primary-side winding of the transformer, a secondary-side winding of the transformer is connected to an input end of the rectifier circuit, and an output end of the rectifier circuit is connected to an input end of the filter circuit;

the three-level switch circuit includes a switch unit UC1 and a switch unit UC4, one end of the UC1 is connected to the P, another end of the UC1 is connected to the UREF, an output end of the UC1 is X1, the UC1 includes a first switching transistor Q1 connected between the P and the X1, one end of the UC4 is connected to the N, another end of the UC4 is connected to the UREF, an output end of the UC4 is X4, and the UC4 includes a first switching transistor Q4 connected between the DC voltage output end N and the X4; and the three-level switch circuit further includes a second switching transistor Q2 connected between the X1 and the SM, a second switching transistor Q3 connected between the X4 and the SM, a third switching transistor S1 connected between the P and the SM, and a third switching transistor S2 connected between the N and the SM, where the Q1, Q2, Q3, Q4, S1, and S2 each include a transistor, each of the transistors is connected in parallel to a body diode, and a direction of the body diode is set as follows: the body diode is turned on when the transistor is reverse biased; and the power conversion circuit is configured to implement the method according to any one of the first aspect or the possible implementations of the first aspect.

With reference to the second aspect, in a possible implementation, the UC1 further includes a diode DH connected between the UREF and the X1, where DH is configured to set up the second working state when the S1 and the Q1 are both turned off; and the UC4 further includes a diode DB connected between the UREF and the X4.

In a possible embodiment, besides the DH and the DB, the three-level switch circuit further includes a transistor K1 and a transistor K2 connected between the UREF and the SM; the K1 and the K2 are respectively connected in parallel to a body diode KD1 and a body diode KD2; a direction of the KD1 is set as follows: the KD1 is turned on when the K1 is reverse biased; and a direction of the KD2 is set as follows: the KD2 is turned on when the K2 is reverse biased.

With reference to the second aspect, in a possible implementation, the UC1 further includes a transistor Q5 connected between the UREF and the X1; the Q5 is connected in parallel to a body diode D5; a direction of the D5 is set as follows: the D5 is turned on when the Q5 is reverse biased; the UC4 further includes a transistor Q6 connected between the UREF and the X4; the Q6 is connected in parallel to a body diode D6; and a direction of the D6 is set as follows: the D6 is turned on when the Q6 is reverse biased.

With reference to the second aspect, in a possible implementation, the UC1 and the UC4 include a capacitor C connected between the X1 and the X4.

According to a third aspect, an embodiment of the present application provides a chopper. The chopper includes a three-level switch circuit and a resonant circuit, where the three-level switch circuit is specifically the three-level switch circuit described in the second aspect, and the resonant circuit is specifically the resonant circuit described in the second aspect.

According to a fourth aspect, an embodiment of the present application further provides a non-volatile storage medium, where the non-volatile storage medium is configured to store an instruction used to implement the method according to any one of the first aspect or the possible implementations of the first aspect.

It can be learned that, in a process of controlling the transistors in the power conversion circuit in the embodiments of the present application, when all the transistors are turned off, the body diodes of the related transistors (for example, the S1, the Q1, and the Q2) are turned on based on the current freewheeling function of the resonant circuit, the voltages of the body diodes of the related transistor are a voltage drop across a diode (close to 0). Then, when the S1 is being turned on, the S1 has the ZVS characteristic in the turn-on process, and then, when the Q1 and the Q2 are being turned on, the Q1 and the Q2 also have the ZVS characteristic. This reduces the switching losses in the turn-on processes. In addition, in the embodiments of the present application, a transistor with a low conduction loss is used for the S1, and transistors with a low turn-off loss are used for the Q1 and the Q2. In a conducted state, a majority of a current flows through the S1, and therefore, a conduction loss in the circuit can be greatly reduced. Because the S1 is controlled to be turned on before the Q1 and the Q2 are turned on, when the Q1 and the Q2 are turned on, in a process in which the current switches from a path 1 to a path 2, only an extremely small part of the current needs to be switched. This can avoid extra EMI resulting from a rapid change of the current in a short time, and reduce a current switching loss. Finally, in the turn-off process, the S1 is controlled to be turned off before the Q1 and the Q2 are turned off, and at last, the Q1 and the Q2 are turned off. Because the Q1 and the Q2 have a low turn-off loss, the switching loss in the turn-off process is reduced.

DESCRIPTION OF EMBODIMENTS

The following describes related embodiments of the present application with reference to accompanying drawings.

Figure 1:
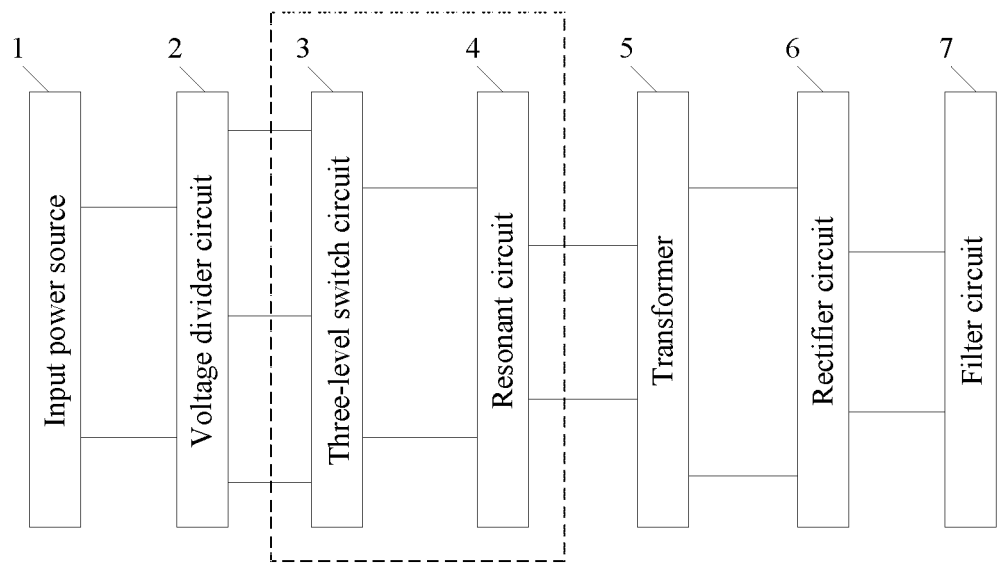
FIG. 1 is a structural diagram of a framework of a power conversion circuit according to an embodiment of the present application.

A power conversion circuit provided in an embodiment of the present application is first described. As shown in FIG. 1, the power conversion circuit proposed in this embodiment of the present application includes an input power source 1, a voltage divider circuit 2, a three-level switch circuit 3, a resonant circuit 4, a transformer 5, a rectifier circuit 6, and a filter circuit 7. These circuits are sequentially connected. The three-level switch circuit 3 and the resonant circuit 4 form a chopper in this embodiment of the present application. Specifically, the input power source 1, for example, may be a DC power source, and the input power source 1 is connected to the voltage divider circuit 2. The voltage divider circuit 2 is configured to perform voltage division on the input power source. The voltage divider circuit 2 may include a plurality of voltage divider capacitors connected in series, for example, may include two voltage divider capacitors C1 and C2 connected in series. The chopper includes the three-level switch circuit 3 and the resonant circuit 4, and is configured to convert an input direct current to a sinusoidal alternating current, and provide an AC voltage VS and a current IS on an output phase wire. Specifically, the three-level switch circuit includes a group of power switching transistors, a group of diodes, and (or) a group of capacitors. An output of the three-level switch circuit 3 is connected to the voltage divider circuit, to be specific, input ends of the three-level switch circuit 3 are respectively connected to three voltage output ends provided by the voltage divider circuit 2: a DC voltage output end P, a reference voltage output end UREF, and a DC voltage output end N. An output of the three-level switch circuit 3 is connected to an input of the resonant circuit 4. The resonant circuit 4 includes an inductor and a capacitor, and the inductor and the capacitor are connected in series to form a resonant cavity (for example, the resonant circuit 4 is an LLC resonant circuit). One end of the resonant cavity is connected to a middle point of the three-level switch circuit 3, and another end of the resonant cavity is connected to the UREF (a middle point between the voltage divider capacitor C1 and the voltage divider capacitor C2) in the voltage divider circuit after passing through a primary-side winding of the transformer. The primary-side winding of the transformer 5 is connected to an output of the resonant circuit 4, and a secondary-side winding of the transformer is connected to the rectifier circuit 6. Specifically, the rectifier circuit 6 includes a rectifier bridge (a secondary side bridge arm) and is configured to rectify the input current. An output of the rectifier circuit 6 is connected to an input of the filter circuit 7. The filter circuit 7 includes a capacitor and is configured to filter the input current.

Figure 2:
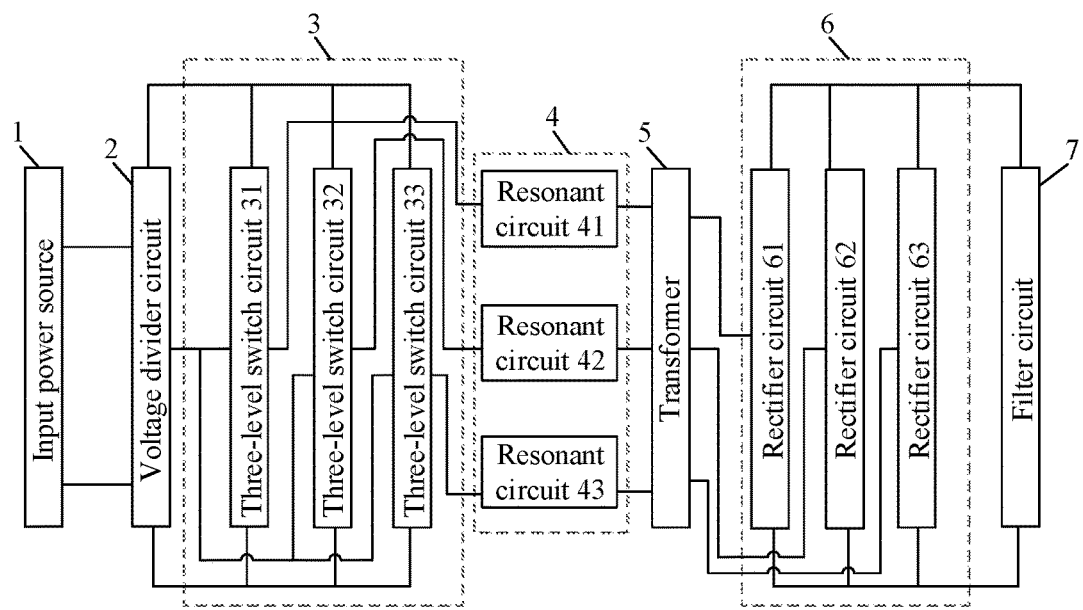
FIG. 2 is a structural diagram of a framework of another power conversion circuit according to an embodiment of the present application.

It should be noted that, the related circuits and connection relationships in the power conversion circuit shown in FIG. 1 are merely examples of this embodiment of the present application, and impose no limitation. In actual application, the power conversion circuit may have a plurality of implementations. For example, referring to FIG. 2, in an implementation, the foregoing related circuits proposed in this embodiment of the present application form a three-phase power conversion circuit. The three-phase power conversion circuit also includes the input power source 1, the voltage divider circuit 2, the three-level switch circuit 3, the resonant circuit 4, the transformer 5, the rectifier circuit 6, and the filter circuit 7. However, a few of the circuits have different circuit deployments and circuit connections. To be specific, the three-level switch circuit includes a three-level switch circuit 31, a three-level switch circuit 32, and a three-level switch circuit 33 connected in parallel, and the resonant circuit includes a resonant circuit 41, a resonant circuit 42, and a resonant circuit 43 connected in parallel. Middle points of the three-level switch circuit 31, the three-level switch circuit 32 and the three-level switch circuit 33 are respectively connected to the resonant circuit 41, the resonant circuit 42, and the resonant circuit 43, to provide a three-phase input to the primary-side winding of the transformer. The secondary-side winding of the transformer provides a three-phase output to a rectifier circuit 61, a rectifier circuit 62, and a rectifier circuit 63. After being rectified, all of the output is output to the filter circuit for filtering.

Figure 3:
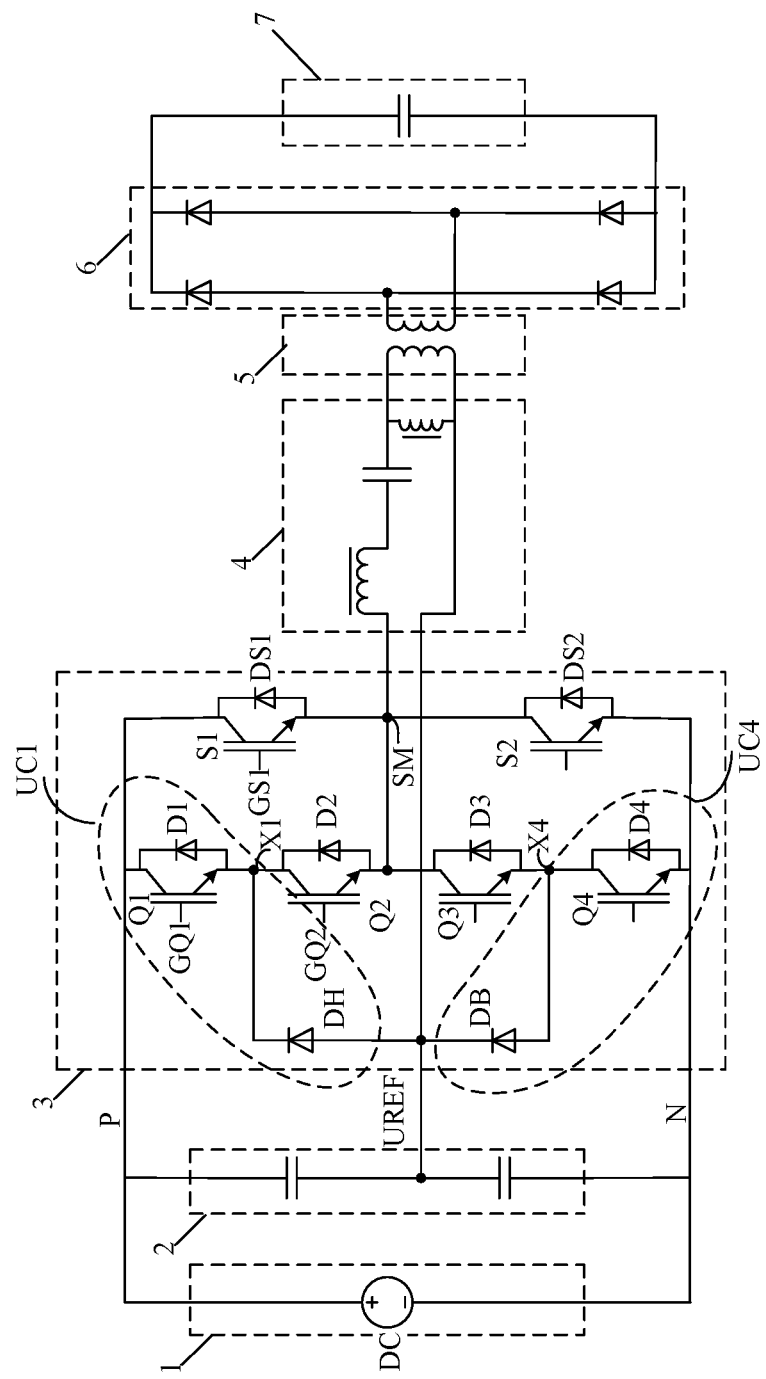
FIG. 3 is a schematic structural diagram of a power conversion circuit according to an embodiment of the present application.

In the chopper that includes the three-level switch circuit and the resonant circuit, the three voltage output ends (N, UREF, and P) provided by the voltage divider circuit provide inputs to the three-level switch circuit, and an output end SM of the three-level switch circuit outputs, for different working states, voltages which are $-U/2$, UREF, and $+U/2$. Referring to FIG. 3, in a specific implementation, the three-level switch circuit includes two switch units: a switch unit UC1 and a switch unit UC4 that are controlled by a control unit (shown in FIG. 4). One end of the switch unit UC1 is connected to a positive DC voltage input end P of a positive voltage source, another end of the switch unit UC1 is connected to a reference voltage output end UREF, and an output end of the UC1 is X1. One end of the switch unit UC4 is connected to a negative DC voltage input end N, another end of the switch unit UC4 is connected to the reference voltage output end UREF, and an output end of the UC4 is X4. Specifically, the UC1 includes a first switching transistor Q1, and the Q1 is a transistor. A collector of the Q1 is connected to the P, and an emitter of the Q1 is connected to the output end X1. The Q1 is connected in parallel to a body diode D1, and a direction of the D1 is set as follows: the D1 is turned on when the Q1 is reverse biased. Optionally, the UC1 further includes a diode DH. An anode of the DH is connected to the UREF, and a cathode of the DH is connected to the output end X1. The UC4 includes a first switching transistor Q4, and the Q4 is a transistor. An emitter of the Q4 is connected to the N, and a collector of the Q4 is connected to the output end X4. The Q4 is connected in parallel to a body diode D4, and a direction of the D4 is set as follows: the D4 is turned on when the Q4 is reverse biased. Optionally, the UC4 further includes a diode DB. A cathode of the DB is connected to the UREF, and an anode of the DB is connected to the output end X4.

The shown three-level switch circuit further includes a second switching transistor Q2 and a second switching transistor Q3 that are controlled by the control unit. The Q2 and the Q3 are both transistors. A collector of the Q2 is connected to the X1, and an emitter of the Q2 is connected to the output end SM of the three-level switch circuit. The Q2 is connected in parallel to a body diode D2, and a direction of the D2 is set as follows: the D2 is turned on when the Q2 is reverse biased. An emitter of the Q3 is connected to the X4, and a collector of the Q3 is connected to the output end SM of the three-level switch circuit. The Q3 is connected in parallel to a body diode D3, and a direction of the D3 is set as follows: the D3 is turned on when the Q3 is reverse biased.

The three-level switch circuit further includes a third switching transistor S1 and a third switching transistor S2 that are controlled by the control unit. The S1 and the S2 are both transistors. A collector of the S1 is connected to the P, and an emitter of the S1 is connected to the SM. An emitter of the S2 is connected to the N, and a collector of the S2 is connected to the SM. One end of the resonant circuit is connected to the SM, and another end of the resonant circuit is connected to the UREF after passing through the primary-side winding of the transformer, to provide current free-wheeling for the three-level switch circuit.

When the S1 is turned on, and the transistor Q1 in the switch unit UC1 and the Q2 are turned on, a voltage at the modulation signal output end SM is basically equal to a DC voltage (+U/2) at the voltage input end P for the UC1. This corresponds to a first working state of the three-level switch circuit. When the S1 and the Q1 are turned off, and the Q2 remains turned on, a voltage at the output end SM is basically equal to a voltage of the reference voltage output end UREF (0). This corresponds to a second working state of the three-level switch circuit. When the S2 is turned on, and the transistor Q4 in the switch unit UC4 and the Q3 are turned on, a voltage at the output end SM is basically equal to a DC voltage (−U/2) at the voltage output end N for the UC4. This corresponds to a third working state of the three-level switch circuit. When the S2 and the Q4 are turned off, and the Q3 remains turned on, a voltage at the output end SM is basically equal to the voltage of the reference voltage output end UREF (0). This corresponds to a fourth working state of the three-level switch circuit.

In an implementation, a conduction loss of the S1 is less than a sum of conduction losses of the Q1 and the Q2, a conduction loss of the S2 is less than a sum of conduction losses of the Q3 and the Q4, a sum of turn-off losses of the Q1 and the Q2 is less than a turn-off loss of the S1, and a sum of turn-off losses of the Q3 and the Q4 is less than a turn-off loss of the S2. In the first working state, a conduction voltage drop across the Q1 and the Q2 is greater than that across the S1, and therefore, a majority of a conducted current flows through the S1, and only a small part of the conducted current flows through the Q1 and the Q2. Because the S1 has a lower conduction loss, a conduction loss of the chopper can be greatly reduced during this conduction. Similarly, in the third working state, a conduction voltage drop across the Q3 and the Q4 is greater than that across the S2, and therefore, a majority of a conducted current flows through the S2, and only a small part of the conducted current flows through the Q3 and the Q4. Because the S2 has a lower conduction loss, a conduction loss of the chopper can be greatly reduced during this conduction.

Figure 4:
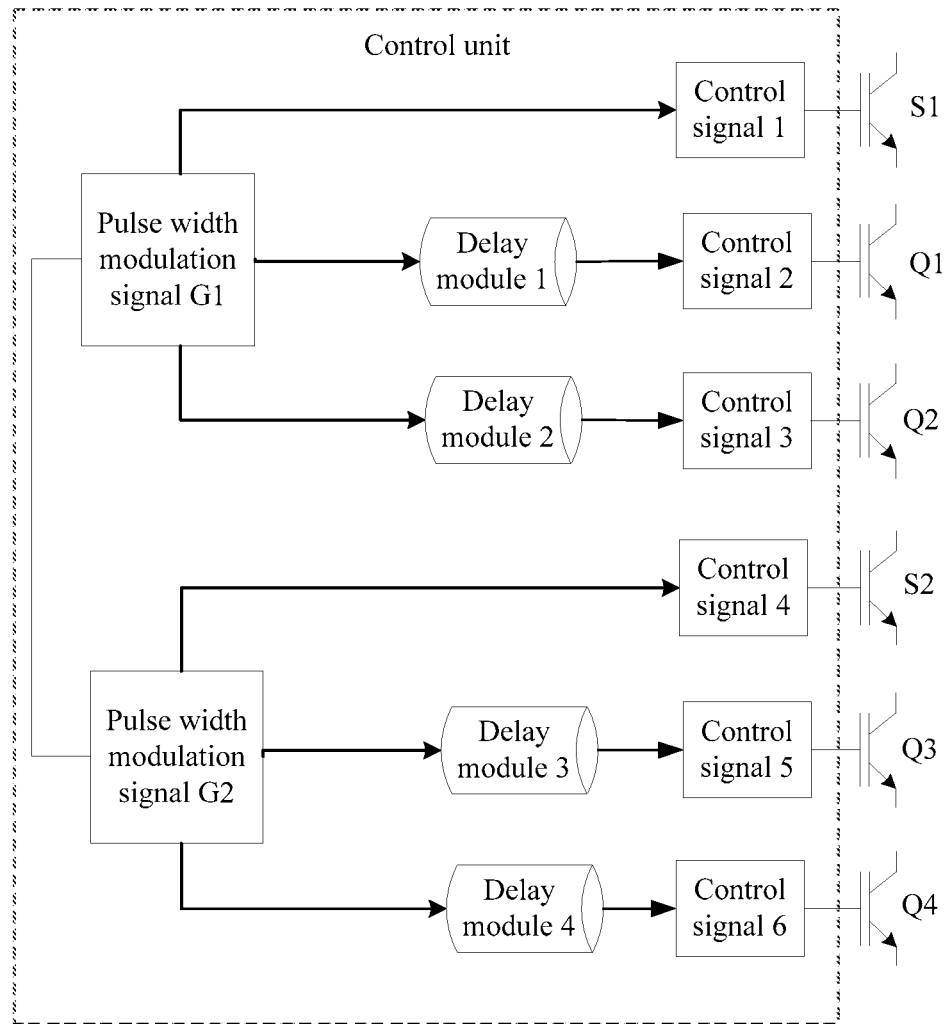
FIG. 4 is a schematic logic diagram of a control unit according to an embodiment of the present application.

In actual working mode, all the switching transistors Q1, Q2, Q3, Q4, S1, and S2 are controlled in an orderly manner by the control unit; turn-on and turn-off of different switching transistors are controlled, so that the chopper outputs AC voltages VSs and alternating currents ISs with different magnitudes and directions. The following describes the control unit in this embodiment of the present application. FIG. 4 is a schematic diagram of controlling different switching transistors by the control unit provided in this embodiment of the present application. The control unit implements orderly control on the switching transistors Q1, Q2, Q3, Q4, S1, and S2 by outputting pulse width modulation signals G1 and G2. When the three-level switch circuit works in a positive half cycle of a pulse width modulation signal, the pulse width modulation signal G1 is output. When the three-level switch circuit works in a negative half cycle of a pulse width modulation signal, the pulse width modulation signal G2 is output. A pulse width modulation signal is usually a high frequency signal, and after being processed in the control unit, the pulse width modulation signal is converted to control signals that can be used to control the switching transistors directly. Control signals (control signals 1 to 6 shown in the figure) finally used for the different transistors are discrete logic signals consistent with the pulse width modulation signals G1 and G2, that is, signals whose magnitudes can be equal to 0 or 1. After the pulse width modulation signal is converted to the control signals, when a magnitude of a control signal used for a control input end of a transistor is equal to 0, the transistor is turned off; when the magnitude is 1, the transistor is turned on.

In addition, delay modules (delay modules 1 to 4 shown in the figure) are further disposed in control branches in which the Q1, Q2, Q3, and Q4 are located. The related delay modules are activated during trailing edges of the pulse width modulation signals G1 and G2, and allow output ends of the delay modules to output the pulse width modulation signal after a delay of a preset time length T. The delay modules are configured, so that when the control signals converted from the pulse width modulation signal G1 switch from 0 to 1, the S1 is turned on, whereas the Q1 will be turned on after a preset time length T11, and the Q2 will be turned on after a preset time length T21; when the control signals converted from the pulse width modulation signal G1 switch from 1 to 0, the S1 is turned off, whereas the Q1 will be turned off after a preset time length T12, and the Q2 will be turned off after a preset time length T22. Similarly, when the control signals converted from the pulse width modulation signal G2 switch from 0 to 1, the S2 is turned on, whereas the Q3 will be turned on after a preset time length T31, and the Q4 will be turned on after a preset time length T41; when the control signals converted from the pulse width modulation signal G2 switch from 1 to 0, the S2 is turned off, whereas the Q3 will be turned off after a preset time length T32, and the Q4 will be turned off after a preset time length T42. It should be noted that, the time lengths of T11, T12, T21, T22, T31, T32, T41, and T42 may be the same or may be different, and values of these preset time lengths are all greater than or equal to 0.

Figure 5:
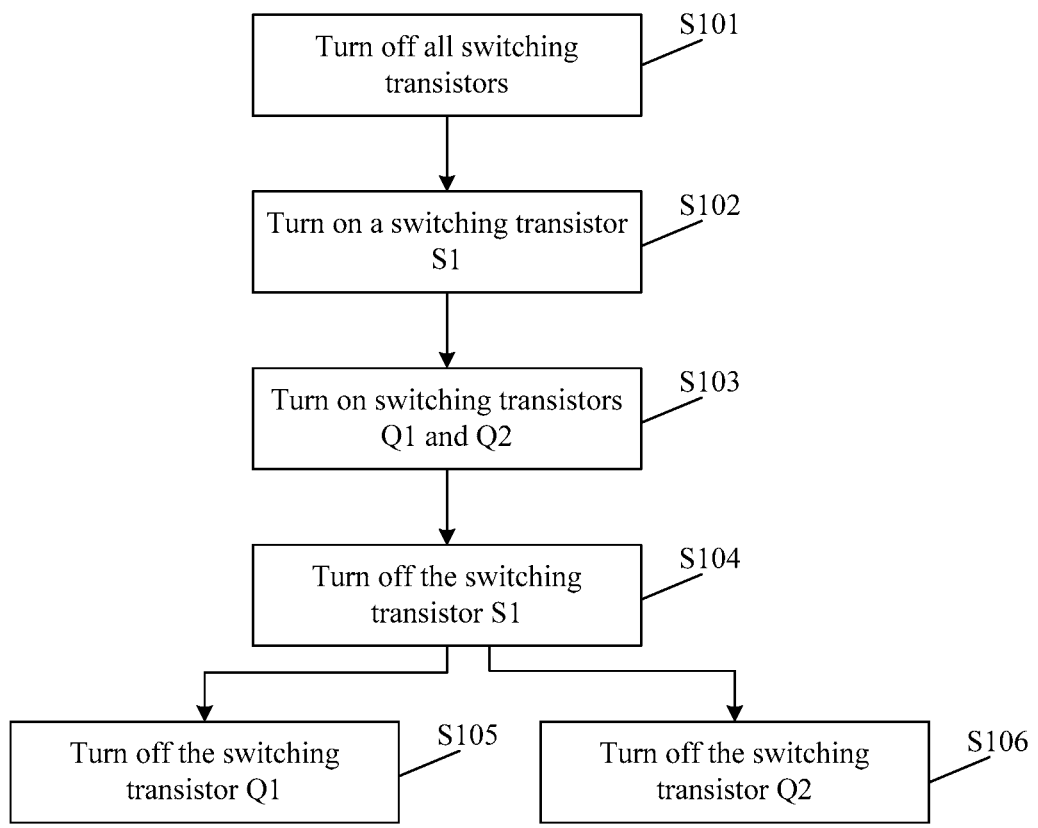
FIG. 5 is a schematic flowchart of a control method of a power conversion circuit according to an embodiment of the present application.

Based on the chopper, the power conversion circuit, and the control unit that are described above, the following describes a control method of the power conversion circuit (namely, a chopper control method) provided in an embodiment of the present application. The method includes a case in which the three-level switch circuit works in a positive half cycle of a pulse width modulation signal, and a case in which the three-level switch circuit works in a negative half cycle of a pulse width modulation signal. The following describes the control method for the case in which the three-level switch circuit works in the positive half cycle of the pulse width modulation signal. Apparently, a person skilled in the art can easily obtain, based on the descriptions, related information about the case in which the three-level switch circuit works in the negative half cycle of the pulse width modulation signal, and therefore, details are not described in the following. In addition, for ease of solution description, a direction in which a current flows from the output end SM to the resonant circuit may be predefined as a positive direction. Referring to FIG. 5, the method includes but is not limited to the following steps.

Figure 6:
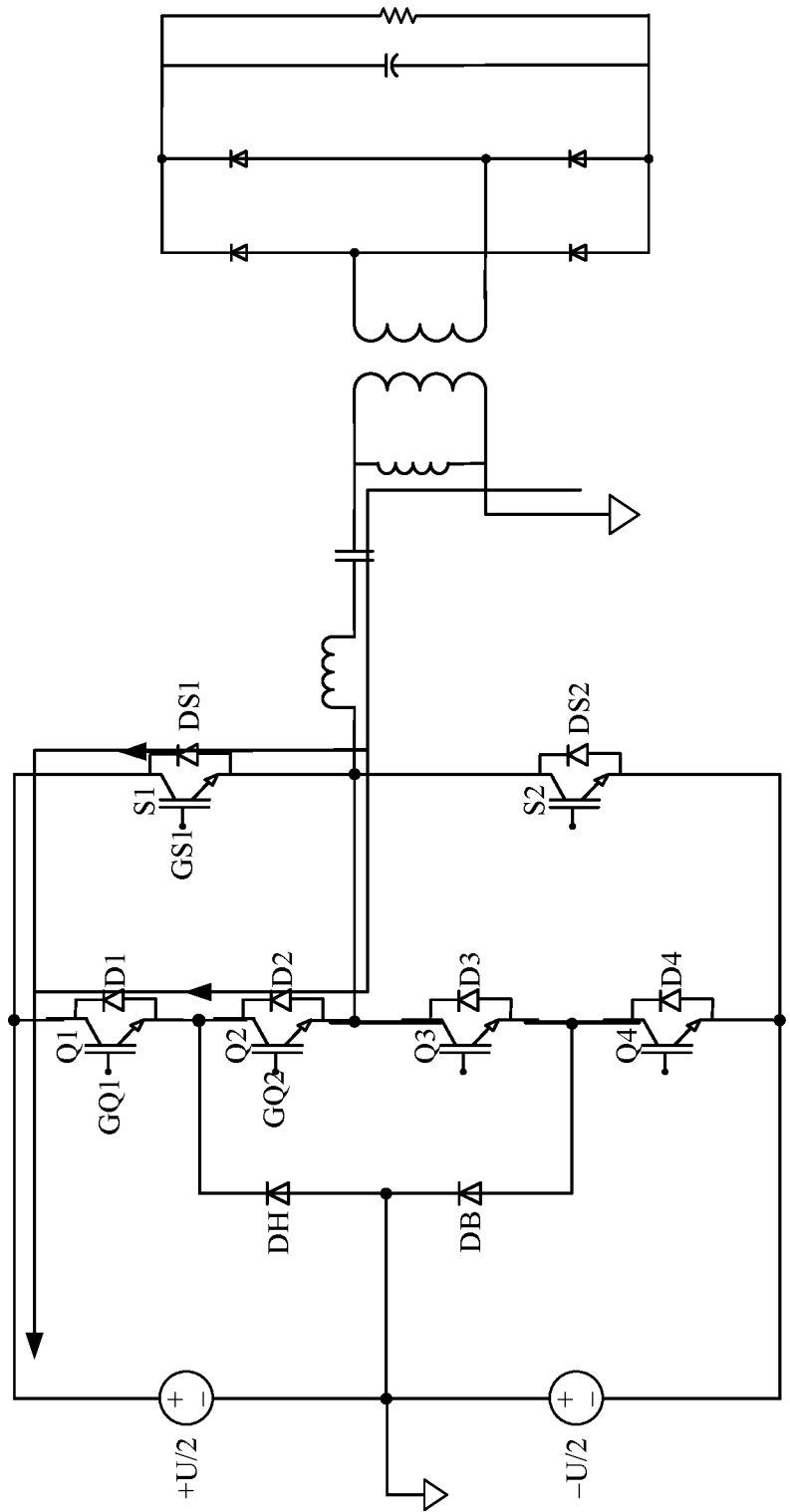
FIG. 6 is a schematic diagram of an application scenario of a power conversion circuit according to an embodiment of the present application.

S101: Control all the switching transistors Q1, Q2, Q3, Q4, S1, and S2 to be off When a powered-on inductive load is powered off, a strong inductive load (for example, a coil) in the resonant circuit generates an electromotive force. In this case, the strong inductive load, serving as a power source, and a branch circuit of the three-level switch circuit form a loop that continuously supplies a current, so as to generate a current freewheeling loop. For example, referring to FIG. 6, each of the Q1, the Q2, and the S1 is connected in parallel to a reverse body diode, and therefore, the current freewheeling loop includes a branch circuit "resonant circuit-DS1-P" and a branch circuit "resonant-D2-D1-P". To be specific, body diodes DS1, D2 and D1 are turned on, and at this moment, voltages of the S1 (or Q1+Q2) are low (only a voltage drop across a diode). This provides a zero-voltage switch (ZVS) condition for turning on the S1 or the Q1 and the Q2 at a next moment.

S102: Control the switching transistor S1 to be turned on.

Figure 7:
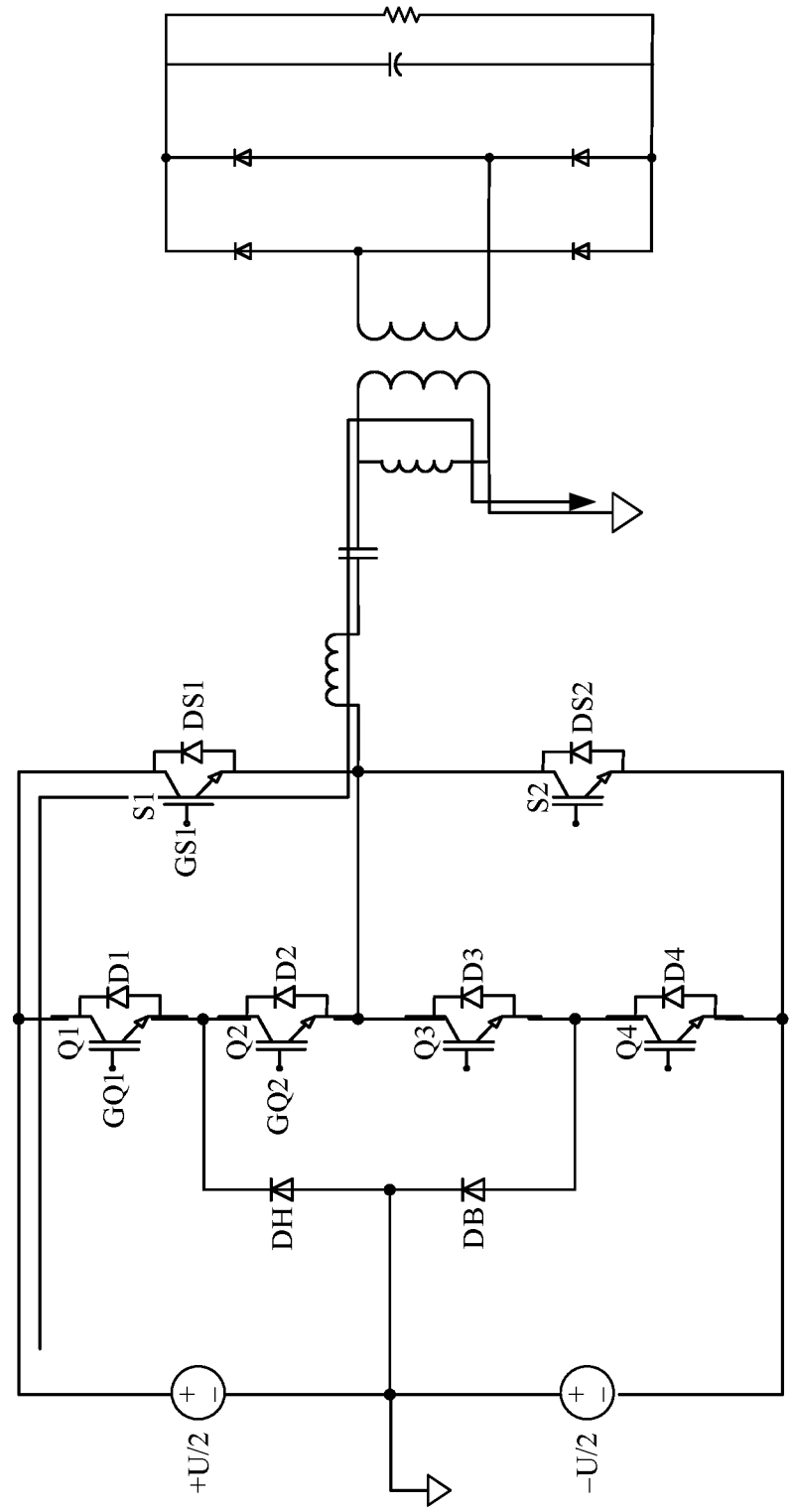
FIG. 7 is a schematic diagram of an application scenario of a power conversion circuit according to an embodiment of the present application.

The body diode of the S1 is already on before the S1 is turned on, and therefore, the S1 is turned on at a zero voltage (or a voltage close to a zero voltage), so that the S1 has a ZVS characteristic, and a conduction loss of the S1 is low in a turn-on process. Referring to FIG. 7, after the S1 is turned on, the current continues to flow through the S1 and the output end SM to the resonant circuit. The S1 has an attribute of a low conduction voltage drop, and therefore, after the S1 is turned on, a conduction loss resulting from the current on the S1 is low.

After the S1 is turned on, the three-level switch circuit sets up a first working state. In this case, the S1 transmits power from the end P to the end SM, that is, the end SM may output a DC voltage (+U/2) to a subsequent circuit.

S103: After the switching transistor S1 is in an on state for a period of time, control the switching transistors Q1 and Q2 to be turned on with a delay. A turn-on time of the Q1 and a turn-on time of the Q2 may be the same, or may be different.

Figure 8:
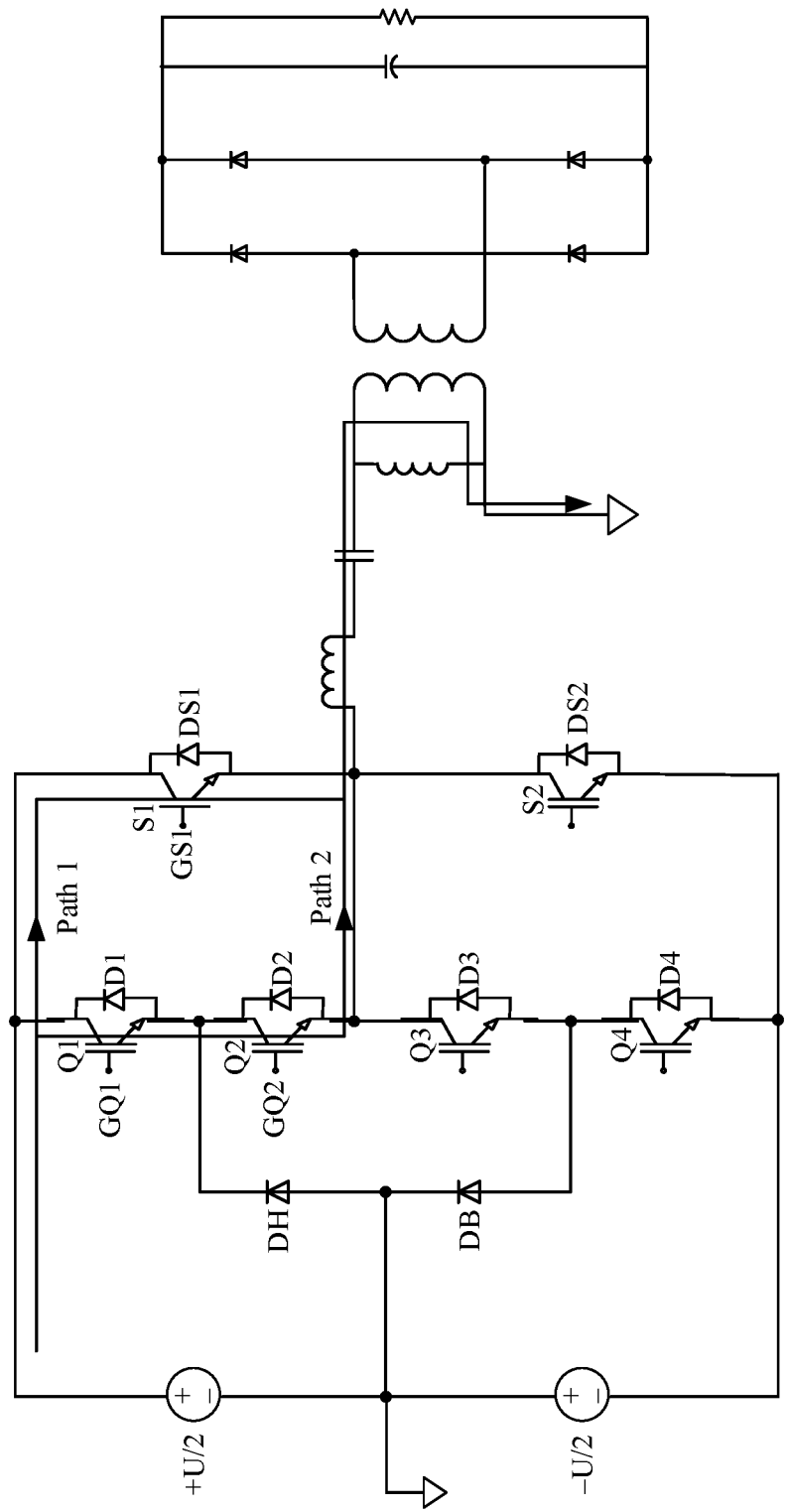
FIG. 8 is a schematic diagram of an application scenario of a power conversion circuit according to an embodiment of the present application.

After the Q1 and the Q2 are both turned on, because a conduction voltage drop across the Q1 and the Q2 is large, only a small part of the current flows through the Q1 and the Q2, and a majority of the current still flows through the S1. Referring to FIG. 8, the majority of the current flows through a path 1, the small part of the current flows through a path 2, and the two parts of the current converge at the output end SM and flow to the resonant circuit. Therefore, in this process, a conduction loss generated by the Q1 and the Q2 is also low.

It should be noted that, in actual application, delayed turn-on times of the Q1 and the Q2 may be adjusted based on optimal working states of the Q1, Q2, and the S1, so as to reduce a conduction loss of the three-level switch circuit to the greatest extent possible.

After the S1, the Q1, and the Q2 are turned on, the three-level switch circuit remains in the first working state. In this case, the S1, the Q1, and the Q2 together transmit power (the S1 transmits a majority of the power) from the end P to the end SM, that is, the end SM may output a DC voltage (+U/2) to a subsequent circuit.

S104: Control the switching transistor S1 to be turned off before the Q1 and the Q2 are turned off Because the Q1 and the Q2 are turned off with a delay, at this moment, the Q1 and the Q2 still remain in an on state. Therefore, when the S1 is turned off, the current flowing through the S1 decreases to 0, whereas the current flowing through the Q1 and the Q2 increases. In this case, the three-level switch circuit still remains in the first working state.

S105: Control the switching transistor Q1 to be turned off

In a possible embodiment, for example, in the embodiment shown in FIG. 3, when the Q1 is turned off, the Q2 is still in an on state, and the three-level switch circuit switches from the first working state to a second working state. In this case, the current loop includes "UREF-DH-Q2-SM", in other words, the SM outputs a level to the UREF.

S106: Control the switching transistor Q2 to be turned off. After the Q2 is turned off, all the switching transistors are in an off state again, and wait to be turned on in a next cycle.

It should be noted that, in a possible embodiment, step S105 is enabled before step S106; in another possible embodiment, step S106 may alternatively be enabled before step S105. In other words, the Q1 may be controlled to be turned off before the Q2 is turned off, based to an actual circuit structure (for example, a circuit structure shown in FIG. 3) of the switch unit UC1. Alternatively, the Q2 may be controlled to be turned off before the Q1 is turned off, based on an actual circuit structure (for example, the following circuit structures shown in FIG. 12 and FIG. 14) of the switch unit UC1. This is not limited in this embodiment of the present application.

Figure 9:
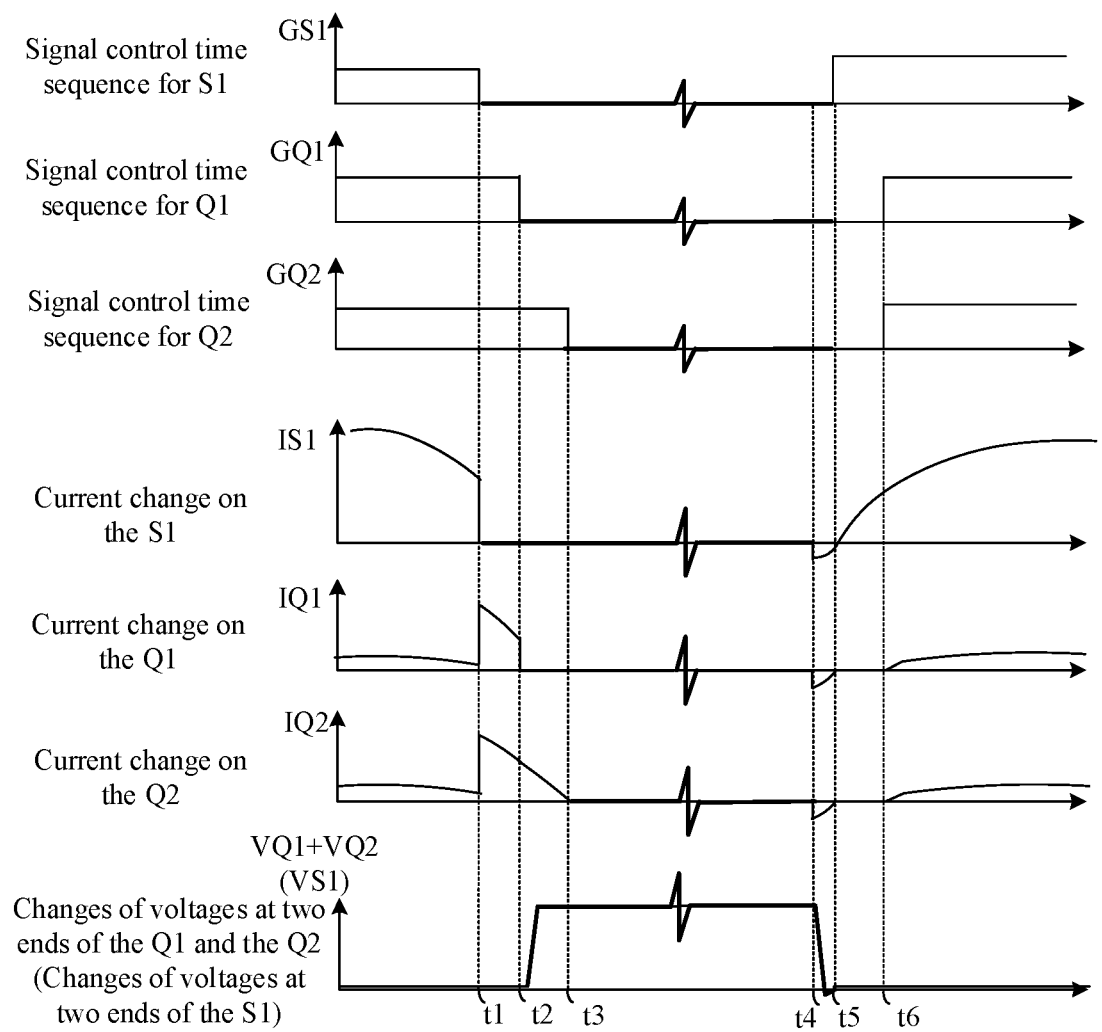
FIG. 9 is a schematic diagram of signal control and electric-property changes of some transistors according to an embodiment of the present application.

For better understanding of the control method described in this embodiment of the present application, the following describes electric-property changes of related switching transistors in a control process with reference to related accompanying drawings. FIG. 9 shows time sequence control and electric-property change statuses of the related switching transistors (S1, Q1, Q2) when the three-level switch circuit works in a positive half cycle of a pulse width modulation signal. A person skilled in the art can easily infer, from descriptions about electric-property control in this case, descriptions about a case in which the three-level switch circuit works in a negative half cycle of a pulse width modulation signal. Therefore, details about time sequence control and electric-property change statuses of the related switching transistors (S1, Q1, Q2) in the case of the negative half cycle are not described.

FIG. 9 shows control time sequences of related signals of the control unit. The control unit periodically outputs pulse width modulation signals GS1, GQ1, and GQ2 to the S1, the Q1, and the Q2, respectively. When a magnitude of a control signal converted from a pulse width modulation signal is 1, a corresponding switching transistor is turned on. When a magnitude of a control signal converted from a pulse width modulation signal is 0, a corresponding switching transistor is turned off. FIG. 9 further shows change statuses of currents flowing through the related switching transistors (S1, Q1, and Q2) under control of the input signals, and shows change statuses of voltages of the Q1 and the Q2 (or at two ends of the S1) under control of the input signals, that is, a change status of a voltage between the connection point P and the connection point SM.

As shown in FIG. 9, it is assumed that, before a time t1, the S1, the Q1, and the Q2 are all in an on state. In this case, the three-level switch circuit is in the first working state, and the end SM outputs a voltage +U/2. Because a conduction voltage drop across the Q1 and the Q2 is large, a small part of the current flows through the Q1 and the Q2, where IQ1 and IQ2 are smaller, and a majority of the current still flows through the S1, where IS1 is larger. Because the S1 has a property of a low conduction loss, a conduction loss in the three-level switch circuit is relatively low. At this moment, the voltages of the Q1 and the Q2 (the voltages of the S1) are also relatively small and close to 0.

At the time t1, the pulse width modulation signal GS1 for the S1 changes to 0, in other words, a control signal converted from the pulse width modulation signal GS1 changes to 0, and therefore, the S1 is turned off; however, the pulse width modulation signal for the Q2 is delayed to t2 due to a delay module, and the pulse width modulation signal for the Q3 is delayed to t3 due to a delay module. After the S1 is turned off, before the time t2, power between the P and the SM is transmitted through the Q1 and the Q2, so that currents IQ1 and IQ2 correspondingly increase. The voltages of the Q1 and the Q2 (the voltages of the S1) are also relatively small and close to 0. In this case, the three-level switch circuit is in the first working state, and the end SM outputs the voltage +U/2.

At the time t2, the pulse width modulation signal GQ1 for the Q1 changes to 0, in other words, a control signal converted from the pulse width modulation signal GQ1 changes to 0, and therefore, the Q1 is turned off. The three-level switch circuit starts to switch to the loop "UREF-DH-Q2-SM", and the three-level switch circuit switches from the first working state to the second working state. The IQ2 starts to decrease, and the voltages of the Q1 and the Q2 (the voltages of the S1) start to increase. Because the Q1 and the Q2 have an attribute of a low turn-off loss, a turn-off loss of the Q1 is low in this process.

At the time t3, the Q2 is turned off, and the voltages of the Q1 and the Q2 (the voltages of the S1) increase to a maximum magnitude (+U/2). It should be noted that, after the Q2 is turned off, in a time period from t3 to t4, the three-level switch circuit may perform related control actions in the negative half cycle of the pulse width modulation signal, and details are not described herein.

In a time period from t4 to t5, after the related control actions in the negative half cycle are completed, all the switching transistors Q1, Q2, Q3, Q4, S1, and S2 are controlled to be off. A strong inductive load in the resonant circuit generates an electromotive force. In this case, the strong inductive load, serving as a power source, and a branch circuit of the three-level switch circuit form a loop that continuously supplies a current, so as to generate a current freewheeling loop. The voltages of the Q1 and the Q2 (the voltages of the S1) start to decrease, and even reverse. Because each of the Q1, the Q2, and the S1 is connected in parallel to a reverse body diode, the current freewheeling loop includes a branch circuit "resonant circuit-DS1-P" and a branch circuit "resonant circuit-D2-D1-P", and a direction of a current is a negative direction. The diodes DS1, D2, and D1 are turned on. At this moment, the voltages of the S1 and the voltages of the Q1 and the Q2 are low (only a voltage drop across a diode). This provides a ZVS condition for turning on the S1 at a next moment.

At the time t5, the control signal converted from the pulse width modulation signal GS1 for the S1 changes to 1, and therefore, the S1 is turned on. The current IS1 flowing through the S1 increases from 0. At this moment, because the voltages of the S1 are small (close to 0), the S1 has a ZVS characteristic in a turn-on process, and a conduction loss of the S1 is low. After the S1 is turned on, the current flowing through the S1 increases rapidly. The S1 has the attribute of a low conduction voltage drop, and therefore, after the S1 is turned on, a conduction loss resulting from the current on the S1 is low. In this case, the three-level switch circuit sets up the first working state. The S1 transmits power from the end P to the end SM, and the end SM may output a DC voltage (+U/2) to a subsequent circuit. The voltages of the S1 and the voltages of the Q1 and the Q2 are small (close to 0).

At a time t6, the control signal converted from the pulse width modulation signal GQ1 for the Q1 changes to 1, and therefore, the Q1 is turned on; and a control signal converted from the pulse width modulation signal GQ2 for the Q2 changes to 1, and therefore, the Q2 is turned on. When the Q1 and the Q2 are being turned on, the voltages of the Q1 and the Q2 are small (close to 0). Therefore, the Q1 and the Q2 also have a ZVS characteristic in a turn-on process. Because a conduction voltage drop across the Q1 and the Q2 is large, only a small part of the current flows through the Q1 and the Q2, where IQ1 and IQ2 are smaller, and a majority of the current still flows through the S1, where IS1 is larger. Because the S1 has the property of a low conduction loss, a conduction loss in the three-level switch circuit is relatively low. In this case, the three-level switch circuit is in the first working state, and the end SM outputs the voltage +U/2.

It should be noted that, in this embodiment of the present application, time lengths of different time periods such as t1 to t2, t2 to t3, t3 to t4, t4 to t5, and t5 to t6 are all greater than or equal to 0, and the time lengths of the different time periods may be set depending on an actual application status.

The power conversion circuit provided in the embodiments of the present application includes the chopper, and the chopper further includes the three-level switch circuit and the resonant circuit. In a process of controlling the chopper, when all the transistors are turned off, the body diodes of the related transistors (for example, the S1, the Q1, and the Q2) are turned on based on the current freewheeling function of the resonant circuit, and the voltages of the related transistor are a voltage drop across a diode (close to 0). Then, when the S1 is being turned on, the S1 has the ZVS characteristic in the turn-on process, and then, when the Q1 and the Q2 are being turned on, the Q1 and the Q2 also have the ZVS characteristic. This reduces switching losses in the turn-on processes. In addition, in the embodiments of the present application, a transistor with a low conduction loss is used for the S1, and transistors with a low turn-off loss are used for the Q1 and the Q2. In a conducted state, the majority of the current flows through the S1, and therefore, the conduction loss in the circuit can be greatly reduced. Because the S1 is controlled to be turned on before the Q1 and the Q2 are turned on, when the Q1 and the Q2 are turned on, in a process in which the current switches from the path 1 to the path 2, only an extremely small part of the current needs to be switched. This can avoid extra electromagnetic interference (EMI) resulting from a rapid change of the current in a short time, and reduce a current switching loss. Finally, in a turn-off process, the S1 is controlled to be turned off before the Q1 and the Q2 are turned off, and at last, the Q1 and the Q2 are turned off. Because the Q1 and the Q2 have the low turn-off loss, a switching loss in the turn-off process is reduced.

The following describes other power conversion circuit structures provided in embodiments of the present application. In the other power conversion circuit structures, corresponding three-level switch circuits have different circuit structures and possible different control manners of some switching transistors.

Figure 10:
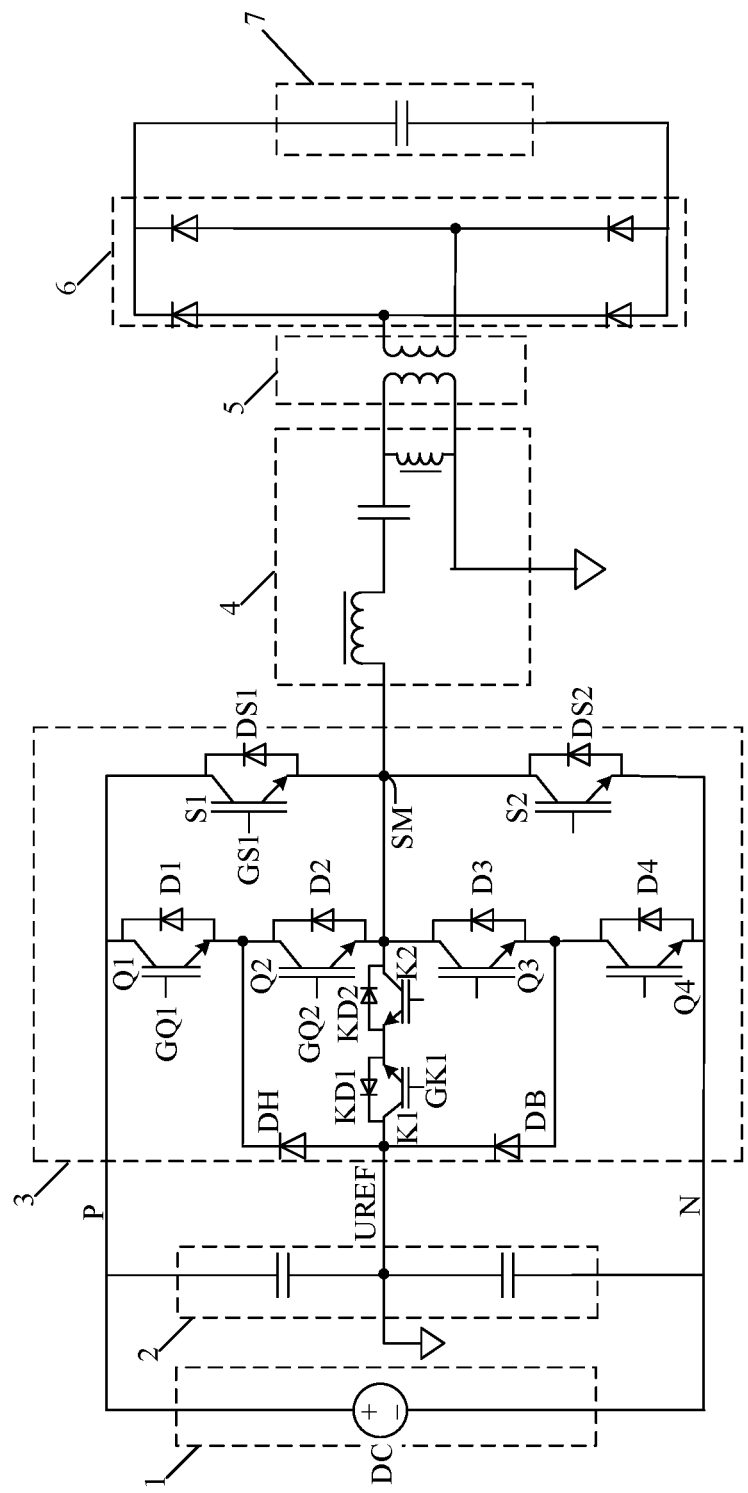
FIG. 10 is a schematic structural diagram of another power conversion circuit according to an embodiment of the present application.

FIG. 10 is a diagram of a possible power conversion circuit structure. A difference between the power conversion circuit structure and the circuit structure shown in FIG. 3 lies in that a transistor K1 and a transistor K2 are added to a three-level switch circuit. The K1 is connected in parallel to a body diode KD1, and a direction of the KD1 is set as follows: the KD1 is turned on when the K1 is reverse biased. The K2 is connected in parallel to a body diode KD2, and a direction of the KD2 is set as follows: the KD2 is turned on when the K2 is reverse biased. A collector of the K1 is connected to a connection point between DH and DB, an emitter of the K1 is connected to an emitter of the K2, and a collector of the K2 is connected to a connection point between Q2 and Q3, so as to be connected to SM.

Figure 11:
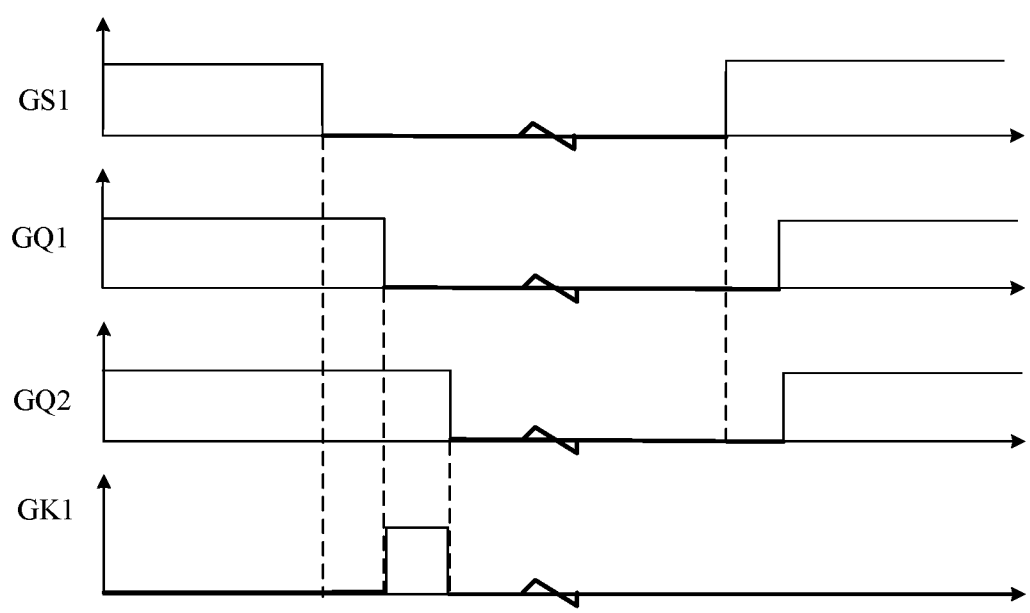
FIG. 11 is a schematic diagram of signal control of some transistors according to an embodiment of the present application.

In this circuit structure, for a manner of controlling different transistors by a control unit, refer to FIG. 11, for example. FIG. 11 shows pulse width modulation signals (GS1, GQ1, GQ2, and GK1) that are respectively output by the control unit to S1, Q1, the Q2, and the K1. It can be learned that, in the control manner, in a turn-on phase of the S1, the Q1, and the Q2, the S1 is controlled to be turned on before the Q1 and the Q2 are turned on, so that the three-level switch circuit sets up a first working state; and in a turn-off phase of the S1, the Q1, and the Q2, the S1 is controlled to be turned off before the Q1 is turned off, and then the Q1 is controlled to be turned off before the Q2 is turned off. In a time period in which the Q1 is off but the Q2 is not yet turned off, the K1 is controlled to be turned on, so that the three-level switch circuit switches from the first working state to a second working state. At last, when the Q2 is turned off, the K1 is also turned off. For a specific analyzing process, refer to related descriptions in the embodiment of FIG. 9, and details are not described herein again.

Figure 12:
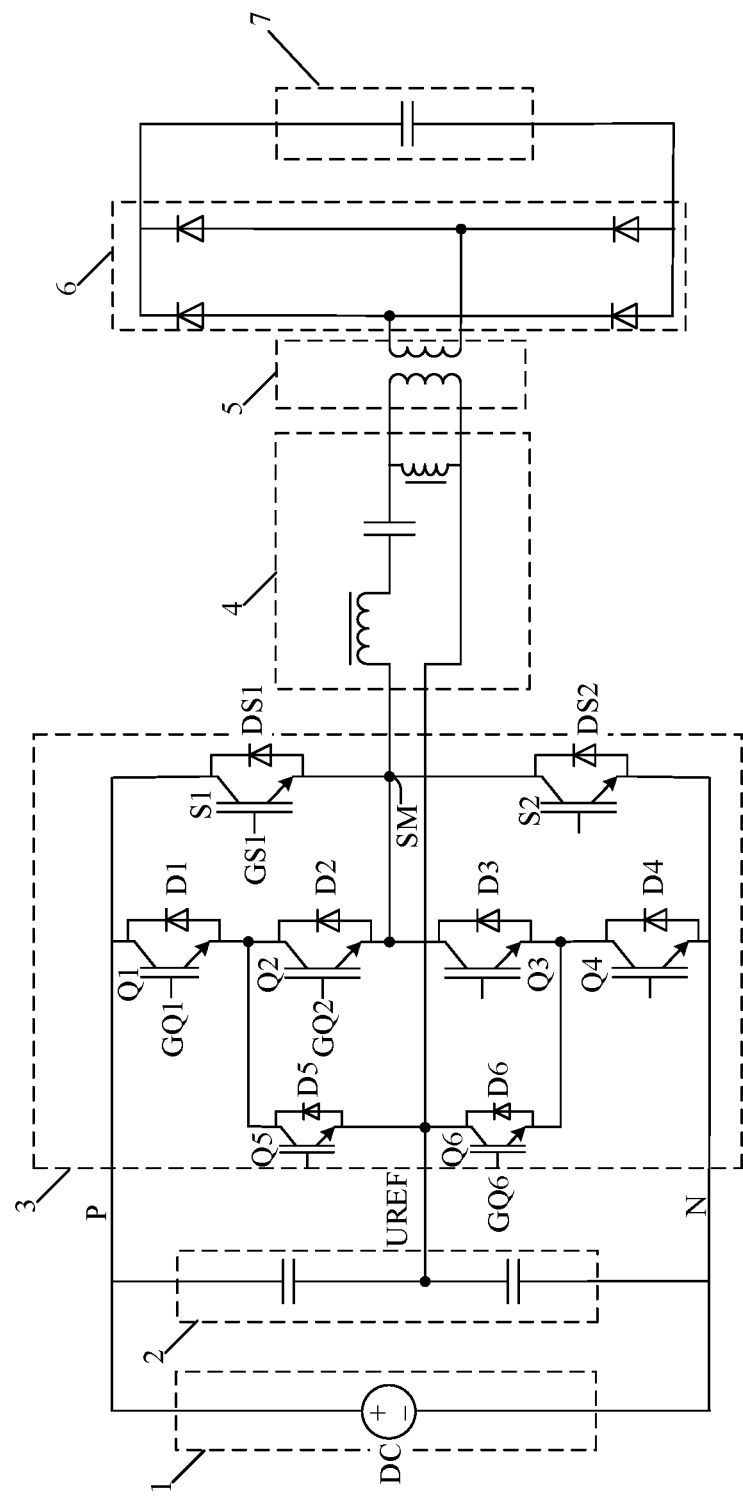
FIG. 12 is a schematic structural diagram of another power conversion circuit according to an embodiment of the present application.

FIG. 12 is a diagram of a possible power conversion circuit structure. A difference between the power conversion circuit structure and the circuit structure shown in FIG. 3 lies in that, in a three-level switch circuit, a transistor Q5 and a transistor Q6 are used in place of the DH and the DB. The Q5 is connected in parallel to a body diode D5, and a direction of the D5 is set as follows: the D5 is turned on when the Q5 is reverse biased. The Q6 is connected in parallel to a body diode D6, and a direction of the D6 is set as follows: the D6 is turned on when the Q6 is reverse biased. A collector of the Q5 is connected to an output end X1 of UC1, and an emitter of the Q5 is connected to UREF. An emitter of the Q6 is connected to an output end X4 of UC4, and a collector of the Q6 is connected to the UREF.

Figure 13:
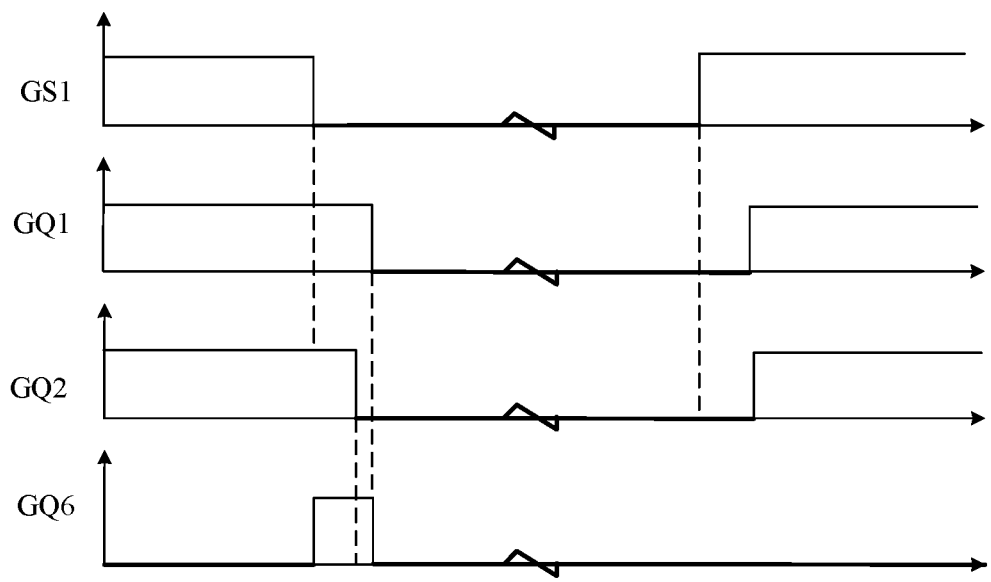
FIG. 13 is a schematic diagram of signal control of some transistors according to an embodiment of the present application.

In this circuit structure, for a manner of controlling different transistors by a control unit, refer to FIG. 13, for example. FIG. 13 shows pulse width modulation signals (GS1, GQ1, GQ2, and GQ6) that are respectively output by the control unit to S1, Q1, Q2, and the Q6. It can be learned that, in the control manner, in a turn-on phase of the S1, the Q1, and the Q2, the S1 is controlled to be turned on before the Q1 and the Q2 are turned on, so that the three-level switch circuit sets up a first working state; and in a turn-off phase of the S1, the Q1, and the Q2, the S1 is controlled to be turned off before the Q2 is turned off, and then the Q2 is controlled to be turned off before the Q1 is turned off. In addition, when the Q2 is to be turned off, the Q6 is controlled to be turned on, so that the three-level switch circuit switches from the first working state to a second working state after the Q2 is turned off. At last, when the Q1 is turned off, the Q6 is also turned off. For a specific analyzing process, refer to related descriptions in the embodiment of FIG. 9, and details are not described herein again.

Figure 14:
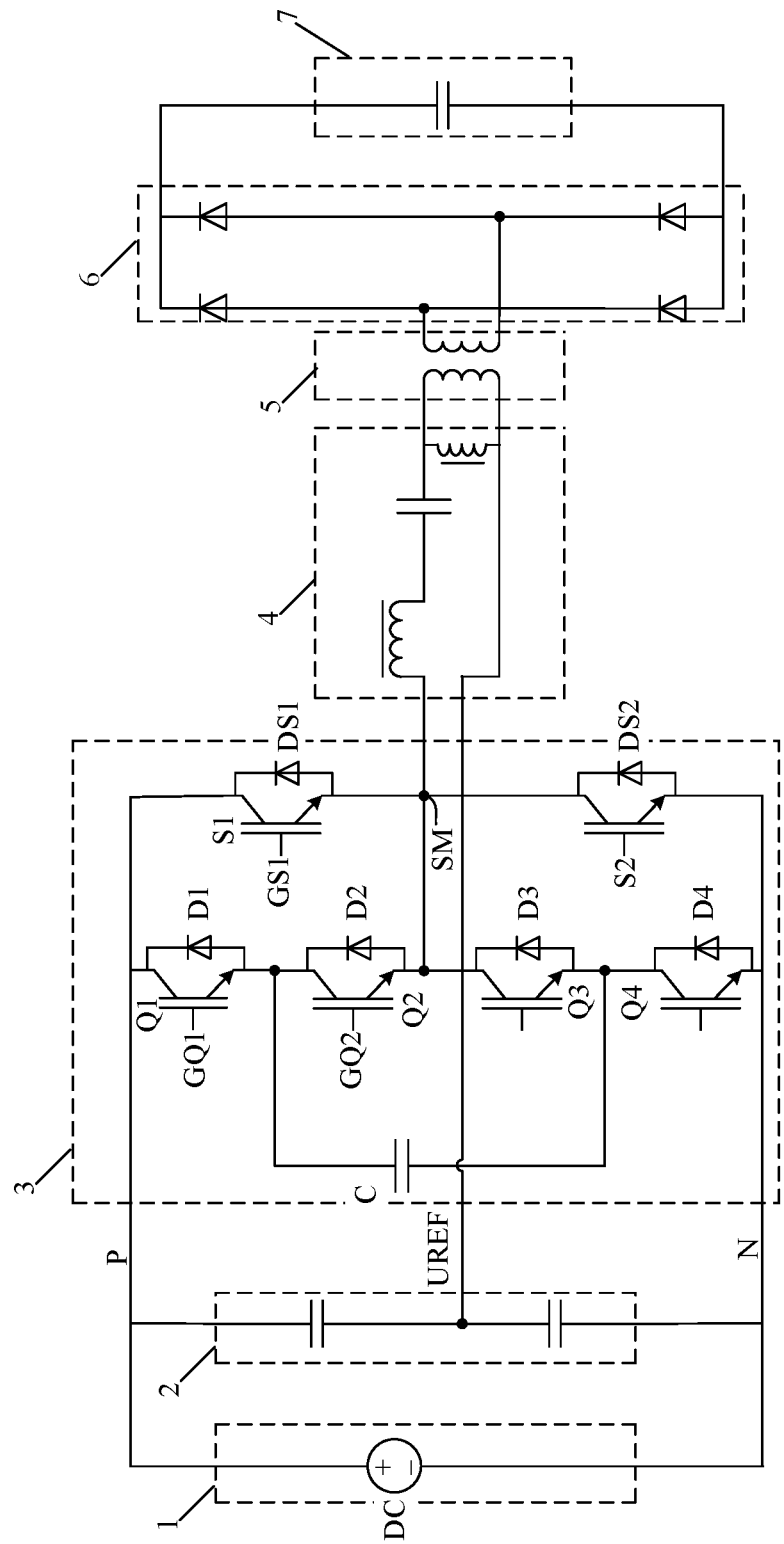
FIG. 14 is a schematic structural diagram of another power conversion circuit according to an embodiment of the present application.

FIG. 14 is a diagram of a possible power conversion circuit structure. A difference between the power conversion circuit structure and the circuit structure shown in FIG. 3 includes the following: in a three-level switch circuit, a capacitor C is used in place of the DH and the DB. One end of the capacitor C is connected to an output end X1 of UC1, and another end of the capacitor C is connected to an output end X4 of UC4.

Figure 15:
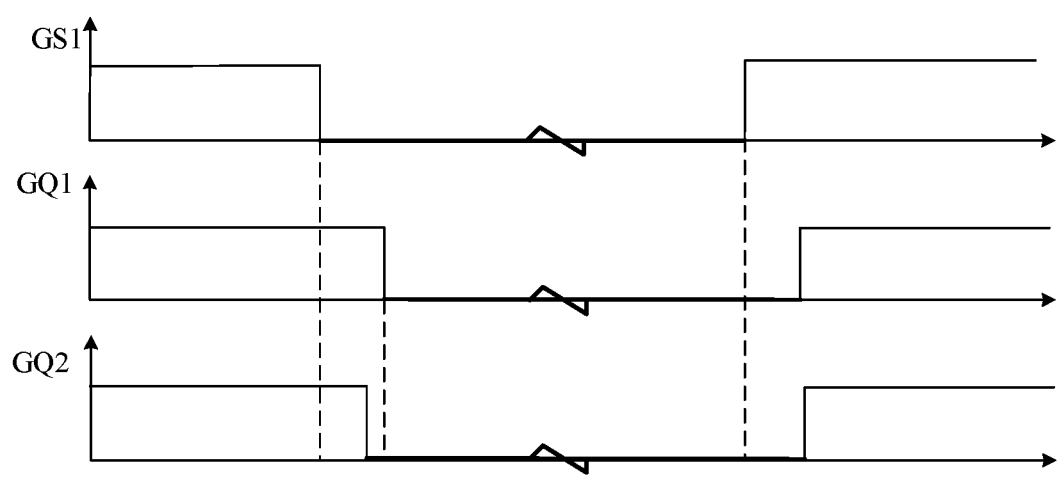
FIG. 15 is a schematic diagram of signal control of some transistors according to an embodiment of the present application.

In this circuit structure, for a manner of controlling different transistors by a control unit, refer to FIG. 15. FIG. 15 shows pulse width modulation signals (GS1, GQ1, and GQ2) that are respectively output by the control unit to S1, Q1, and Q2. It can be learned that, in the control manner, in a turn-on phase of the S1, the Q1, and the Q2, the S1 is controlled to be turned on before the Q1 and the Q2 are turned on, so that the three-level switch circuit sets up a first working state; and in a turn-off phase of the S1, the Q1, and the Q2, the S1 is controlled to be turned off before the Q2 is turned off, and then the Q2 is controlled to be turned off before the Q1 is turned off. In a period in which the Q2 is off but the Q1 is not yet turned off, the three-level switch circuit switches from the first working state to a second working state. For a specific analyzing process, refer to related descriptions in the embodiment of FIG. 9, and details are not described herein again.

It should be noted that, in the foregoing embodiments, descriptions of each embodiment have a respective focus. For a part that is not described in detail in an embodiment, refer to related descriptions in other embodiments.

What is claimed is:

1. A power conversion circuit, comprising:
a three-level switch circuit, a resonant circuit, a transformer, a rectifier circuit, and a filter circuit, three input ends of the three-level switch circuit are respectively connected to a first DC voltage output end (P), a reference voltage output end (UREF), and a second DC voltage output end (N), an output end (SM) of the three-level switch circuit is connected to an input end of the resonant circuit, an output end of the resonant circuit is connected to a primary-side winding of the transformer, a secondary-side winding of the transformer is connected to an input end of the rectifier circuit, and an output end of the rectifier circuit is connected to an input end of the filter circuit, wherein the three-level switch circuit comprises a first switch unit (UC1) and a second switch unit (UC4), one end of the first switch unit is connected to the first DC voltage output end, another end of the first switch unit is connected to the reference voltage output end, an output end of the first switch unit is (X1), and wherein the first switch unit comprises a first switching transistor (Q1) connected between the first DC voltage output end and the output end of the first switch unit, and wherein one end of the second switch unit is connected to the second DC voltage output end, another end of the second switch unit is connected to the reference voltage output end, an output end of the second switch unit is (X4), and the second switch unit comprises a first fourth switching transistor (Q4) connected between the second DC voltage output end and the output end of the second switch unit, and wherein the three-level switch circuit further comprises a second switching transistor (Q2) connected between the output end of the first switching unit and the output end, a third switching transistor Q3 connected between the output end of the second switch unit and the output end, a seventh switching transistor (S1) connected between the first DC voltage output end and the output end, and an eighth switching transistor (S2) connected between the second DC voltage output end and the output end, and wherein each of the transistors is connected in parallel to a body diode, and a direction of the body diode is set so that the body diode is turned on when the transistor connected in parallel to the body diode is reverse biased, and wherein the power conversion circuit is configured to:
control all the transistors to be turned off, wherein a first body diode connected in parallel to the seventh switching transistor, a second body diode connected in parallel to the first switching transistor, and a third body diode connected in parallel to the second switching transistor are turned on based on a current freewheeling function of the resonant circuit;

control the seventh switching transistor to be turned on, to set up a first working state of the power conversion circuit; and after the first working state lasts for a time length (T1), control the first switching transistor and the second switching transistor to be turned on.

2. The power conversion circuit according to claim 1, wherein the power conversion circuit is further configured to:

control the seventh switching transistor to be turned off before the first switching transistor is turned off; and control the first switching transistor to be turned off before the second switching transistor is turned off, to switch from the first working state to a second working state.

3. The power conversion circuit according to claim 2, wherein the first switch unit further comprises:

a first diode (DH) connected between the reference voltage output end and the output end of the first switch unit, the first diode is configured to set up the second working state when the seventh switching transistor and the first switching transistor are both turned off, and the second switch unit further comprises a second diode (DB) connected between the reference voltage output end and the output end of the second switch unit.

4. The power conversion circuit according to claim 3, wherein the three-level switch circuit further comprises:

a first transistor (K1) and a second transistor (K2) that are connected between the UREF reference voltage output end and the output end; and the first transistor and the second transistor are respectively connected in parallel to a fourth body diode (KD1) and a fifth body diode (KD2);

wherein a direction of the fourth body diode is set as follows:

the fourth body diode is turned on when the first transistor is reverse biased; and wherein a direction of the fifth body diode is set as follows:

the fifth body diode is turned on when the second transistor is reverse biased; and the first transistor is configured to set up the second working state when the seventh switching transistor and the first switching transistor are both turned off.

5. The power conversion circuit according to claim 1, wherein the power conversion circuit is further configured to:

control the seventh switching transistor to be turned off before the second switching transistor is turned off; and control the second switching transistor to be turned off before the first switching transistor is turned off, to switch from the first working state to a second working state.

6. The power conversion circuit according to claim 5, wherein:

the first switch unit further comprises a fifth transistor (Q5) connected between the reference voltage output end and the output end of the first switch unit; and the fifth transistor is connected in parallel to a sixth body diode (D5), wherein a direction of the sixth body diode is set as follows:

the sixth body diode is turned on when the fifth transistor is reverse biased;

the second switch unit further comprises a sixth transistor (Q6) connected between the reference voltage output end and the output end of the second switch unit;

the sixth transistor is connected in parallel to a seventh body diode (D6); and wherein a direction of the seventh body diode is set as follows:

the seventh body diode is turned on when the sixth transistor is reverse biased; and the sixth transistor is configured to set up the second working state when the seventh switching transistor and the second switching transistor are both turned off.

7. The power conversion circuit according to claim 5, wherein the first switch unit and the second switch unit comprise a capacitor connected between the output end of the first switch unit and the output end of the second switch unit, and the capacitor his configured to set up the second working state when the seventh switching transistor and the second switching transistor are both turned off.

8. The power conversion circuit according to claim 1, wherein in response to the three-level switch circuit working in a negative half cycle of a pulse width modulation signal, then the power conversion circuit is further configured to:

control all the transistors to be turned off, wherein the body diodes are turned on based on the current freewheeling function of the resonant circuit;

control the eighth switching transistor to be turned on, to set up a third working state of the power conversion circuit; and after the third working state lasts for a time length (T2) control the third switching transistor and the fourth switching transistor to be turned on.

9. The power conversion circuit according to claim 8, wherein the power conversion circuit is further configured to:

control the eighth switching transistor to be turned off before the fourth switching transistor is turned off; and control the fourth switching transistor to be turned off before the third switching transistor is turned off to switch from the third working state to a fourth working state.

10. The power conversion circuit according to claim 1, wherein a conduction loss of the seventh switching transistor is less than a sum of conduction losses of the first switching transistor and the second switching transistor, a conduction loss of the eighth switching transistor is less than a sum of conduction losses of the third switching transistor and the fourth switching transistor, a sum of turn-off losses of the first switching transistor and the second switching transistor is less than a turn-off loss of the seventh switching transistor, and a sum of turn-off losses of the third switching transistor and the fourth switching transistor is less than a turn-off loss of the eighth switching transistor.

* * * * *

UNITED STATES PATENT AND TRADEMARK OFFICE
CERTIFICATE OF CORRECTION

PATENT NO. : 11,201,549 B2
APPLICATION NO. : 16/945091
DATED : December 14, 2021
INVENTOR(S) : Zhang et al.

It is certified that error appears in the above-identified patent and that said Letters Patent is hereby corrected as shown below:

In the Claims

Claim 1: Column 16, Line 44: "(X4), and the second switch unit comprises a first fourth" should read -- (X4), and the second switch unit comprises a fourth --.

Claim 4: Column 17, Line 33: "connected between the UREF reference voltage output" should read -- connected between the reference voltage output --.

Claim 7: Column 18, Line 22: "comprise a capacitor connected between the output end of" should read -- comprise a capacitor (C) connected between the output end of --.

Claim 7: Column 18, Line 24: "unit, and the capacitor his configured to set up the second" should read -- unit, and the capacitor is configured to set up the second --.

Claim 8: Column 18, Line 37: "after the third working state lasts for a time length (T2)" should read -- after the third working state lasts for a time length (T2), --.

Signed and Sealed this
Thirty-first Day of May, 2022

Katherine Kelly Vidal
*Director of the United States Patent and Trademark Office*